US011718176B2

(12) United States Patent
Nishiyama et al.

(10) Patent No.: US 11,718,176 B2
(45) Date of Patent: Aug. 8, 2023

(54) INFORMATION PROVIDING SYSTEM, INFORMATION PROVIDING METHOD, INFORMATION TERMINAL, AND INFORMATION DISPLAY METHOD

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 17/014,155

(22) Filed: Sep. 8, 2020

(65) Prior Publication Data

US 2021/0174101 A1 Jun. 10, 2021

(30) Foreign Application Priority Data

Dec. 5, 2019 (JP) ................................ 2019-220297

(51) Int. Cl.
*G06V 20/58* (2022.01)
*B60K 35/00* (2006.01)
(Continued)

(52) U.S. Cl.
CPC ............... *B60K 35/00* (2013.01); *B60R 1/00* (2013.01); *G06F 18/24* (2023.01); *G06V 10/25* (2022.01); *G06V 10/56* (2022.01); *G06V 20/584* (2022.01); *G06V 40/10* (2022.01); *G06V 40/23* (2022.01); *B60K 2370/167* (2019.05); *B60K 2370/176* (2019.05); *G06V 20/58* (2022.01)

(58) Field of Classification Search
CPC ...... G06V 20/584; G06V 20/58; G06V 40/10; G06V 10/40; B60R 1/00; B60K 35/00; B60K 2370/167; B60K 2370/176
See application file for complete search history.

(56) References Cited

U.S. PATENT DOCUMENTS 8,117,071 B1 *  2/2012  Fitch .................... G06Q 20/208
                                                        705/16
9,934,685 B1 *  4/2018  Bernhardt .............. G08G 1/095
(Continued)

FOREIGN PATENT DOCUMENTS

JP    2003-162793 A    6/2003
JP    2017-191502 A    10/2017
(Continued)

*Primary Examiner* — Shaghayegh Azima
(74) *Attorney, Agent, or Firm* — Dinsmore & Shohl LLP (57) ABSTRACT

An onboard camera image application system includes multiple vehicles, an information providing system, and a PC. In the information providing system, a collection server collects image data captured by onboard cameras of the vehicles. An analysis server extracts, from the image data captured around one location, feature information associated with an extraction item for a person or a vehicle around the location. The analysis server also classifies the extracted feature information by classification item. A providing server sends the classified feature information to the PC of a user. The user is able to set a location to be processed, through the PC, and is also able to set the extraction item or the classification item.

11 Claims, 9 Drawing Sheets

| VEHICLE NUMBER | DATE | TIME | DAY OF WEEK | WEATHER | ATMOSPHERIC TEMPERATURE | PERSON NUMBER | RELATIVE LOCATION | MOVEMENT DIRECTION | MEANS OF MOBILITY | SEX | AGE | CLOTHES | FACE | RELATION WITH SURROUNDINGS |
|---|---|---|---|---|---|---|---|---|---|---|---|---|---|---|
| 12 | 2019/11/22 | 15:22:10 | FRIDAY | SHINE | 17 | 130 | RIGHT SIDEWALK 25 M FROM B | C→B | WALK | FEMALE | 19-30 | TOP: SWEATER BOTTOM: SKIRT | HAIR LENGTH: MEDIUM HAIR COLOR: BROWN GLASSES: NO | GOING WITH 132 |
| 12 | 2019/11/22 | 15:22:10 | FRIDAY | SHINE | 17 | 132 | RIGHT SIDEWALK 25 M FROM B | C→B | WALK | UNKNOWN | 3-5 | TOP: SWEATER BOTTOM: PANTS | HAIR LENGTH: MEDIUM HAIR COLOR: BLACK GLASSES: NO | GOING WITH 130 |
| 12 | 2019/11/22 | 15:22:10 | FRIDAY | SHINE | 17 | 142 | LEFT LANE 26 M FROM B | C→B | VEHICLE FOUR WHEEL Y PRODUCED BY X COMPANY NUMBER: ZZZ | MALE | 41-50 | TOP: T-SHIRT BOTTOM: UNKNOWN | HAIR LENGTH: SHORT HAIR COLOR: UNKNOWN GLASSES: NO | |
| 12 | 2019/11/22 | 15:22:11 | FRIDAY | SHINE | 17 | 134 | RIGHT SIDEWALK 39 M FROM B | B→C | WALK | MALE | 13-18 | TOP: UNIFORM BOTTOM: UNIFORM | HAIR LENGTH: SHORT HAIR COLOR: BLACK GLASSES: UNKNOWN | |

(51) Int. Cl.

|  |  |
|---|---|
| *B60R 1/00* | (2022.01) |
| *G06V 40/10* | (2022.01) |
| *G06F 18/24* | (2023.01) |
| *G06V 10/25* | (2022.01) |
| *G06V 10/56* | (2022.01) |
| *G06V 40/20* | (2022.01) |

(56) References Cited

U.S. PATENT DOCUMENTS

| | | | |
|---|---|---|---|
| 10,558,868 B2* | 2/2020 | Zhao | G06V 20/588 |
| 2015/0030204 A1* | 1/2015 | Lee | G06T 7/246 |
| | | | 382/103 |
| 2015/0379782 A1* | 12/2015 | Nakagawa | G07B 15/063 |
| | | | 705/13 |
| 2017/0323540 A1 | 11/2017 | Boykin | |
| 2019/0054904 A1* | 2/2019 | Jang | B60T 8/171 |
| 2019/0066492 A1* | 2/2019 | Nijhuis | G06V 20/52 |
| 2019/0188495 A1* | 6/2019 | Zhao | G06F 18/24 |
| 2020/0060605 A1* | 2/2020 | Pajula | A61B 5/4205 |
| 2020/0233626 A1 | 7/2020 | Fujii et al. | |
| 2021/0070286 A1* | 3/2021 | Green | B60W 60/0027 |
| 2021/0326585 A1* | 10/2021 | Tu | G06V 40/193 |
| 2021/0383688 A1* | 12/2021 | Chen | G06V 10/764 |
| 2022/0230457 A1* | 7/2022 | Buscemi | G06V 20/586 |
| 2023/0108621 A1* | 4/2023 | Jeon | G06T 7/73 |
| | | | 382/103 |

FOREIGN PATENT DOCUMENTS

| | | |
|---|---|---|
| JP | 2019144915 A | 8/2019 |
| JP | 2019185237 A | 10/2019 |
| JP | 2020-115160 A | 7/2020 |

* cited by examiner

| VEHICLE NUMBER | DATE | TIME | DAY OF WEEK | WEATHER | ATMOSPHERIC TEMPERATURE | PERSON NUMBER | RELATIVE LOCATION | MOVEMENT DIRECTION | MEANS OF MOBILITY | SEX | AGE | CLOTHES | FACE | RELATION WITH SURROUNDINGS |
|---|---|---|---|---|---|---|---|---|---|---|---|---|---|---|
| 12 | 2019/11/22 | 15:22:10 | FRIDAY | SHINE | 17 | 130 | RIGHT SIDEWALK 25 M FROM B | C→B | WALK | FEMALE | 19-30 | TOP: SWEATER BOTTOM: SKIRT | HAIR LENGTH: MEDIUM HAIR COLOR: BROWN GLASSES: NO | GOING WITH 132 |
| 12 | 2019/11/22 | 15:22:10 | FRIDAY | SHINE | 17 | 132 | RIGHT SIDEWALK 25 M FROM B | C→B | WALK | UNKNOWN | 3-5 | TOP: SWEATER BOTTOM: PANTS | HAIR LENGTH: MEDIUM HAIR COLOR: BLACK GLASSES: NO | GOING WITH 130 |
| 12 | 2019/11/22 | 15:22:10 | FRIDAY | SHINE | 17 | 142 | LEFT LANE 26 M FROM B | C→B | VEHICLE FOUR WHEEL PRODUCED BY X COMPANY NUMBER: ZZZ | MALE | 41-50 | TOP: T-SHIRT BOTTOM: UNKNOWN | HAIR LENGTH: SHORT HAIR COLOR: UNKNOWN GLASSES: NO | |
| 12 | 2019/11/22 | 15:22:11 | FRIDAY | SHINE | 17 | 134 | RIGHT SIDEWALK 39 M FROM B | B→C | WALK | MALE | 13-18 | TOP: UNIFORM BOTTOM: UNIFORM | HAIR LENGTH: SHORT HAIR COLOR: BLACK GLASSES: UNKNOWN | |

FIG. 8

INFORMATION PROVIDING SYSTEM, INFORMATION PROVIDING METHOD, INFORMATION TERMINAL, AND INFORMATION DISPLAY METHOD

CROSS-REFERENCE TO RELATED APPLICATIONS

This application claims priority to Japanese Patent Application No. 2019-220297 filed on Dec. 5, 2019, which is incorporated herein by reference in its entirety including the specification, drawings and abstract.

BACKGROUND

1. Technical Field

The disclosure relates to an information providing system, an information providing method, an information terminal, and an information display method that use vehicle onboard cameras.

2. Description of Related Art

Vehicles equipped with onboard cameras that capture images outside the vehicles are increasingly used.

Japanese Unexamined Patent Application Publication No. 2003-162793 (JP 2003-162793 A) describes that road traffic congestion information is acquired based on image data captured by an onboard camera.

SUMMARY

Image data from an onboard camera may be used for applications other than the purpose of acquiring traffic congestion information, described in JP 2003-162793 A. Particularly, when users are able to conduct desired information analyses on desired locations, applications of image data from onboard cameras will expand.

The disclosure provides information extracted from image data from onboard cameras so as to suit the needs of users.

An aspect of the disclosure provides an information providing system. The information providing system includes a collection unit configured to collect image data, captured by multiple onboard cameras, in association with information of locations of the captured image data, an extraction unit configured to extract, from the image data captured around one location, feature information associated with an extraction item for a person or a vehicle around the location, a classification unit configured to classify the extracted feature information by classification item, and a providing unit configured to provide the classified feature information to a user. The location, the extraction item, or the classification item is set based on a request from the user.

In the aspect of the disclosure, the extraction item may include at least one of movement information, age, and sex of the person.

In the aspect of the disclosure, the extraction item may include at least one of movement information, type, and occupant information of the vehicle.

In the aspect of the disclosure, the collection unit may be configured to acquire the image data further in association with timing information of the captured image data, the classification item may include an item to be classified by time, and the classification unit may be configured to classify the extracted feature information by time based on the timing information.

In the aspect of the disclosure, the information providing system may further include a duplication prevention unit configured to, when the image data captured by the multiple onboard cameras contains the person or the vehicle twice or more, prevent duplicate extraction of the feature information.

In the aspect of the disclosure, the information providing system may further include an estimation unit configured to make an estimation based on the feature information extracted under a similar condition for a time period during which no image data is captured by the multiple onboard cameras.

In the aspect of the disclosure, the information providing system may further include an accepting unit configured to accept a request from the user to provide information with the designated extraction item. When there is no feature information associated with the designated extraction item, the extraction unit may be configured to newly extract the feature information associated with the extraction item, the classification unit may be configured to classify the extracted feature information, and the providing unit may be configured to provide the newly classified feature information to the user.

In the aspect of the disclosure, the information providing system may further include an accepting unit configured to accept a request from the user to provide information with the designated classification item. When there is no feature information associated with the designated classification item, the classification unit may be configured to newly classify the feature information by the classification item, and the providing unit may be configured to provide the newly classified feature information to the user.

In the aspect of the disclosure, the information providing system may further include an accepting unit configured to accept a request from the user to provide information. When there is no image data that meets the accepted request, the collection unit may be configured to newly collect the image data that meets the request.

In the aspect of the disclosure, the information providing system may further include a billing unit configured to bill the user according to the set extraction item or the set classification item.

Another aspect of the disclosure provides an information providing method. The information providing method includes collecting image data, captured by multiple onboard cameras, in association with information of locations of the captured image data, extracting, from the image data captured around one location, feature information associated with an extraction item for a person or a vehicle around the location, classifying the extracted feature information by classification item, and providing the classified feature information to a user. The location, the extraction item, or the classification item is set based on a request from the user.

Another aspect of the disclosure provides an information terminal. The information terminal includes a setting unit configured to set a location, an extraction item, or a classification item, a receiving unit configured to, for a person or a vehicle that passes around the location, receive data containing feature information extracted for the extraction item from image data captured by multiple onboard cameras and classified by the classification item, and a display unit configured to display the received data.

Another aspect of the disclosure provides an information display method. The information display method includes setting a location, an extraction item, or a classification item, for a person or a vehicle that passes around the location, receiving data containing feature information extracted for the extraction item from image data captured by multiple onboard cameras and classified by the classification item, and displaying the received data.

According to the aspects of the disclosure, it is possible to provide information about a person or a vehicle extracted from image data from onboard cameras in a form that meets the needs of users.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment will be described with reference to the accompanying drawings. In the description, for the sake of easy understanding, specific modes will be described; however, these modes are intended to illustrate the embodiment, and other various embodiments are possible.

Figure 1:
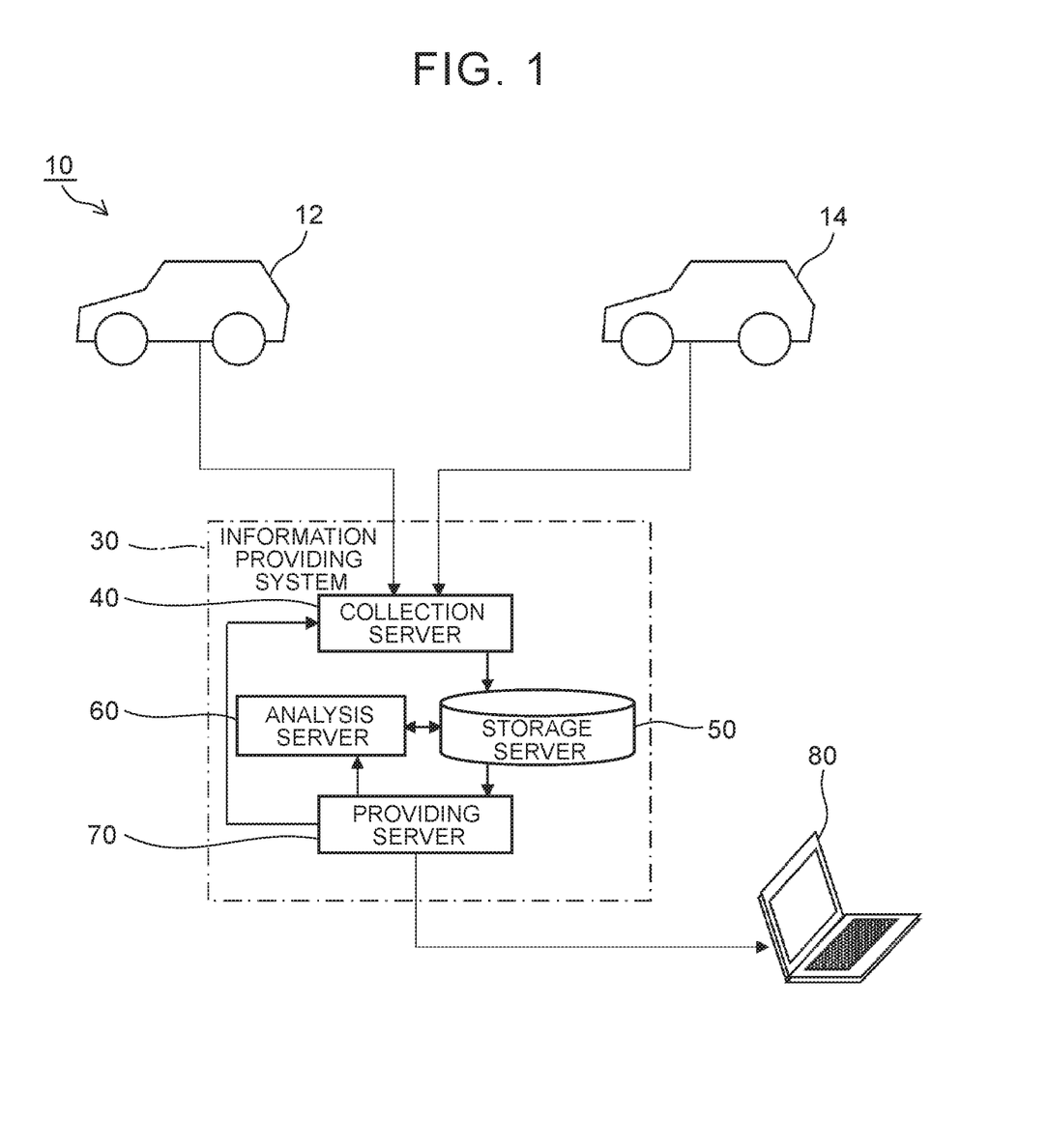
FIG. 1 is a block diagram that shows the schematic configuration of an onboard camera image application system according to an embodiment.

FIG. 1 is a block diagram that shows the schematic configuration of an onboard camera image application system 10 according to the embodiment. The onboard camera image application system 10 is a system that connects image data captured by onboard cameras, analyzes the captured image data, and then provides the analyzed results to users. The onboard camera image application system 10 includes vehicles 12, 14, an information providing system 30, and a personal computer (PC) 80.

The two vehicles 12, 14 in FIG. 1 typically represent many vehicles equipped with onboard cameras. In areas where people do activities, the many vehicles 12, 14 are usually running, and scenes inside and outside the vehicles are captured at various locations under various environments by the onboard cameras. Captured image data is sent to the information providing system 30.

The information providing system 30 is a system made up of one or multiple hardware components installed in an office or the like of a corporation that provides information. The information providing system 30 may be made up of hardware components distributed at remote locations and connected via a network. The information providing system 30 includes a collection server 40, a storage server 50, an analysis server 60, and a providing server 70. The collection server 40 receives image data from the vehicles 12, 14 with which an agreement has been made in advance on participating in the onboard camera image application system 10. The storage server 50 saves image data collected by the collection server 40, classified feature information obtained through an analysis conducted by the analysis server 60, and the like. The analysis server 60 executes analysis processes such as a process of extracting feature information and a process of classifying the extracted feature information by conducting an analysis on image data saved in the storage server 50, and saves the obtained classified feature information in the storage server 50. The providing server 70 edits the classified feature information saved in the storage server 50 as needed and then sends the classified feature information to the PC 80.

The PC 80 is an example of an information terminal including a setting unit, a receiving unit, and a display unit. A user uses the PC 80. By installing an application program in the PC 80 or using a web browser or the like on the PC 80, the PC 80 is capable of accessing the information providing system 30 to issue a request to provide information. In issuing a request, a user also provides an instruction to set at least one from among a location, a collection period of image data, an extraction item, and a classification item. Of course, a user may provide an instruction to set any two or any three or all of them. Setting a location may be, for example, designating one point or setting an area having a spatial expanse. Setting a location may be specifying a building or a facility. The PC 80 receives data for provided information and causes a display or the like to display the data. A user is able to use various information terminals, such as a tablet and a smartphone, instead of the PC 80.

Figure 2:
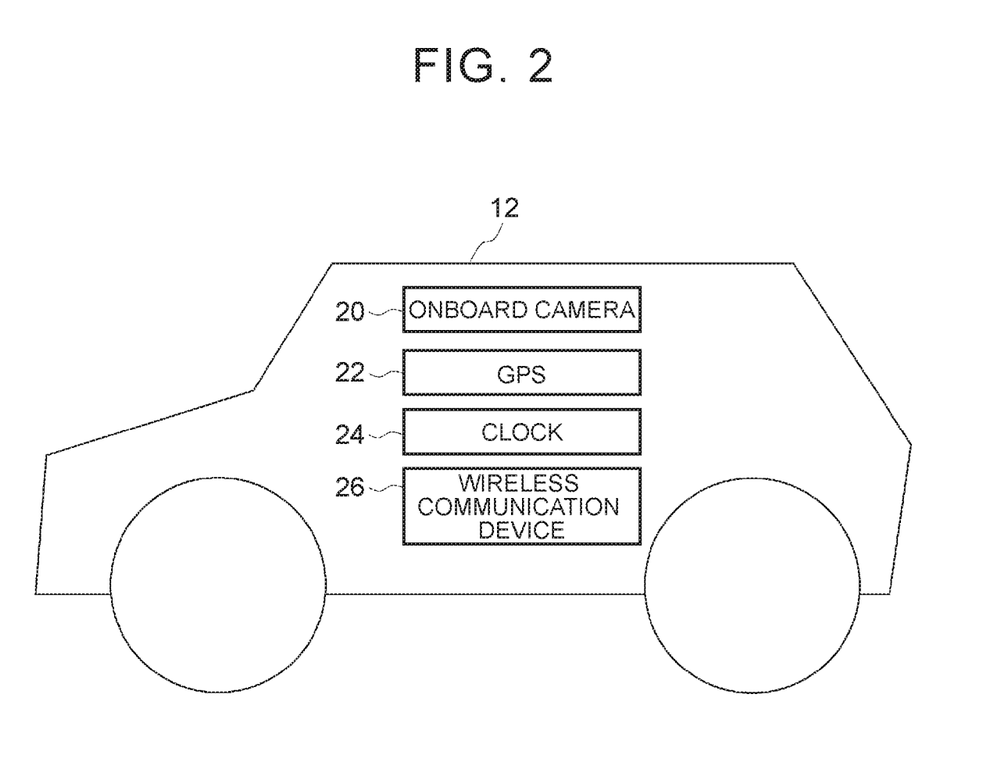
FIG. 2 is a block diagram that shows the schematic configuration of a vehicle.

FIG. 2 is a block diagram that shows the vehicle 12 shown in FIG. 1 in more details. The vehicle 12 includes an onboard camera 20, a GPS 22, a clock 24, and a wireless communication device 26.

The onboard camera 20 is a camera that is mounted on the vehicle 12 and that captures a scene inside or outside the vehicle. The onboard camera 20 is installed, for example, near a roof front end in a vehicle cabin and acquires image data by capturing images outside ahead of the vehicle through a front windshield. Image data is data that provides two-dimensional or three-dimensional visual information. Image data is generally a picture motion; however, image data may be a still image that is captured at adequate time intervals. In the onboard camera image application system 10, image data from the onboard camera 20 is sent to the information providing system 30 and is used to analyze a person or a vehicle. Therefore, the onboard camera 20 that is capable of obtaining image data with a resolution required to analyze a person or a vehicle is installed. To ensure a resolution or a field of vision, a multiple number of the onboard cameras 20 may be provided.

The onboard camera 20 may also function as, for example, a drive recorder that records a running situation of the vehicle 12. When the vehicle 12 has, for example, a self-driving mode, the onboard camera 20 may also function as a sensor that gets hold of a traffic situation ahead of the vehicle. A visible light camera that uses visible light is generally used as the onboard camera 20; however, cameras with various wavelength bands, such as an infrared camera and an ultraviolet camera, may be employed. The onboard camera 20 may be the one that captures an area to the side of the vehicle 12, an area behind the vehicle 12, or the like.

The GPS 22 is an abbreviation of Global Positioning System and is a sensor that detects the location of the vehicle 12 by using artificial satellites. A location detected by the GPS 22 is used as capture location data to determine where image data from the onboard camera 20 of the vehicle 12 is captured. When capture location data is tracked in time series, a travel route of the vehicle 12 is obtained.

The clock 24 is a device that indicates timing, that is, date and time. An output of the clock 24 is used as capture time data that is timing information to determine timing at which image data from the onboard camera 20 of the vehicle 12 is captured.

The wireless communication device 26 is a device that communicates with external devices by wireless communication, such as Wi-Fi (registered trademark). The vehicle 12 sends captured image data and associated capture location data and capture time data to the information providing system 30 through the wireless communication device 26.

The vehicle 12 may be further provided with a sensor that acquires data related to weather, such as a temperature sensor and a solar radiation sensor. During image capturing, an associated output of the sensor may be sent to the information providing system 30 as capture weather data through the wireless communication device 26 together with image data.

Figure 3:
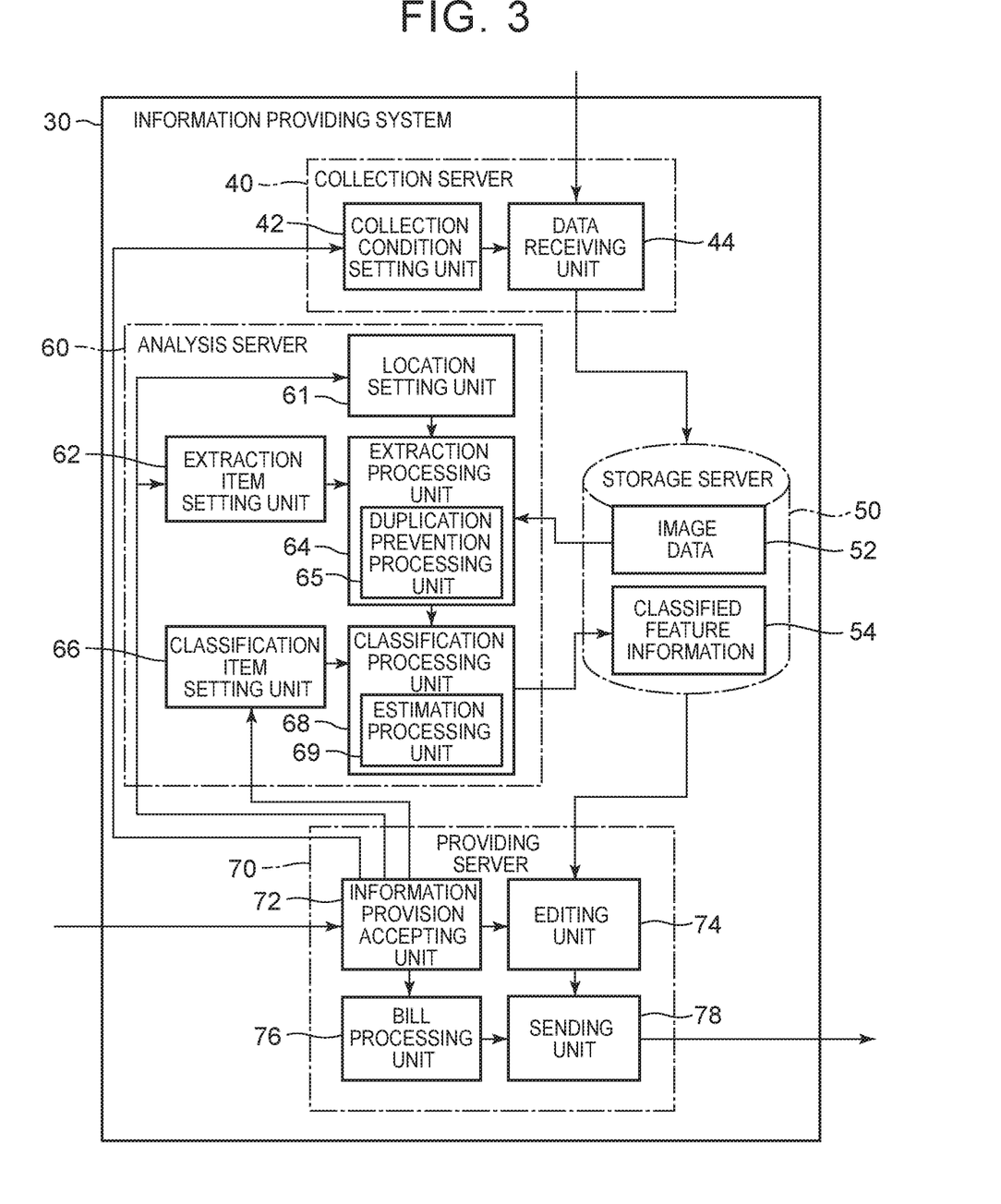
FIG. 3 is a block diagram that shows the schematic configuration of an information providing system.

FIG. 3 is a block diagram that shows the functions of the information providing system 30 in details. The information providing system 30 includes the collection server 40, the storage server 50, the analysis server 60, and the providing server 70. The collection server 40, the storage server 50, the analysis server 60, and the providing server 70 each are a device constructed by software components, such as an operating system (OS) and an application program, controlling a computer hardware component including memory, a processor, and the like.

The collection server 40 is an example of the collection unit. A collection condition setting unit 42 and a data receiving unit 44 are implemented in the collection server 40 under control of the application program.

The collection condition setting unit 42 is to set a condition for a target to collect image data from the onboard camera 20. A collection condition may be set by a manager or may be automatically set based on a program. Examples of the collection condition include a designated area to be collected, designated vehicles 12, 14 to be collected in an area (such as the number of vehicles, type, and travel speed), designated capture time, and a designated capture period. By setting a collection condition, it is possible to actively collect, for example, image data in an area where the vehicles 12, 14 rarely run or image data at times when the vehicles 12, 14 rarely run. It is also possible to reduce collection of a large amount of image data in an area where the vehicles 12, 14 often run or image data at times when the vehicles 12, 14 often run more than necessary.

The collection condition setting unit 42 is capable of setting a collection condition in accordance with an instruction from an information provision accepting unit 72 of the providing server 70 (described later). Thus, it is also possible to collect image data around a location for which a request is issued from a user of the PC 80 to provide information and further set, for example, a period to collect image data.

The data receiving unit 44 acquires image data from the vehicles 12, 14 and the like, and associated capture location data, capture time data, capture weather data, or the like in accordance with the collection condition set by the collection condition setting unit 42. The data receiving unit 44 is capable of, where necessary, acquiring travel speed data, type data, and the like at the time of image capturing.

The storage server 50 is a device that stores various data. Image data 52 sent from the data receiving unit 44 of the collection server 40 and associated capture location data, capture time data, capture weather data, or the like are saved in the storage server 50. Classified feature information 54 sent from a classification processing unit 68 of the analysis server 60 is also saved in the storage server 50.

The analysis server 60 includes a location setting unit 61, an extraction item setting unit 62, an extraction processing unit 64, a classification item setting unit 66, and the classification processing unit 68.

The location setting unit 61 is an example of a unit that sets a location and sets a location on which an analysis of image data is conducted. In the location setting unit 61, a location is set in accordance with an instruction from a manager or a program. Alternatively, a user who operates the PC 80 may set a location through the information provision accepting unit 72 of the providing server 70 (described later). Various locations may be set. One point may be designated or an area having a planar expanse may be designated. Information of a set location is sent to the extraction processing unit 64.

The extraction item setting unit 62 is an example of a unit that sets feature information and sets an extraction item to determine which feature information is acquired from image data. Feature information may be set by employing a default value or may be changed by a manager. Feature information may also be set based on a demand from a user through the information provision accepting unit 72 of the providing server 70 (described later).

Feature information means information that indicates the feature of a person or a vehicle contained in image data. For example, feature information of a person includes not only information as to whether a person is present but also movement information, such as a movement direction, a present location (or a movement path), and a movement speed of a person when a person is present. Information on the number of people going around, like whether a person is going around alone, whether a person is going around with other people, and how many people is a person going around with, is also feature information of a person. Feature information of a person also includes age, sex, height, body type (fat, slim, regular, or the like), facial expression (emotions or the like), line-of-sight direction, clothing (clothes, shoes, cap or hat, and the like), accessories (watch, glasses, or the like), and belongings (bag, smartphone, stick, or the like). Furthermore, such activity information, that is, what a person is doing (walking, running, talking, operating a smartphone, taking a dog for a walk, waiting for a bus, smoking, or the like), is also feature information of a person.

Feature information of a vehicle includes not only information as to whether a vehicle is present but also movement information, such as a movement direction, a present location (or movement path), and a movement speed of a vehicle when a vehicle is present. Information on the type of vehicle (whether a vehicle is a four or more wheeled vehicle, a motorcycle, a bicycle, an ordinary passenger automobile, an ordinary vehicle, a commercial vehicle, a taxi, a bus, a truck, or the like), vehicle maker, the color of a vehicle, the color of lights, and the like is also feature information of a vehicle. Furthermore, feature information of a vehicle also includes occupant information of a vehicle (the number of occupants, sex, age, line of sight, and the like), license plate information (place of registration, type, number, and the like). Occupant information of a vehicle is also the above-described feature information of a person.

To extract a large number of such pieces of feature information, a large amount of computation is required. Therefore, the extraction item setting unit 62 sets extraction items.

The extraction processing unit 64 is an example of the extraction unit. The extraction processing unit 64 extracts feature information associated with extraction items from the image data 52 saved in the storage server 50. The extraction processing unit 64 has acquired information of a location to be extracted from the location setting unit 61. The extraction processing unit 64 acquires the image data 52 containing the location from the storage server 50 and executes an extraction process for the location.

An extraction process is executed through, for example, artificial intelligence (AI) processing using machine learning, such as deep learning. Feature information extracted by the extraction processing unit 64 is associated with, for example, capture location data and capture time data. Thus, a comparison process or an information integration process with feature information extracted from image data from other onboard cameras 20 is also possible.

The extraction processing unit 64 includes a duplication prevention processing unit 65. The duplication prevention processing unit 65 is an example of the duplication prevention unit. The duplication prevention processing unit 65 prevents duplicate extraction of feature information when the same person or the same vehicle is captured by the multiple onboard cameras 20. A duplication prevention process will be described later.

The classification item setting unit 66 sets classification items that determine how feature information is classified. Classification items may be set by employing a default value or may be changed by a manager. Classification items may also be set based on a demand from a user through the information provision accepting unit 72 of the providing server 70 (described later).

Classification items are items for classifying feature information. Examples of classification items include items on time, such as season, month, and day of week. A mode of dividing a day into morning, afternoon, evening, and night or dividing a day by an hour or the like is also an example of classification items on time. Classifying feature information of a person by age or by sex is also an example of classification items. Similarly, classifying feature information of a vehicle by type or by the number of occupants is also an example of classification items. Furthermore, weather (weather, such as shine, rain, and snow, atmospheric temperature, or the like) may also be set as a classification item. In this way, various classification items may be set so that users are able to extract useful information from feature information.

The classification processing unit 68 is an example of the classification unit. The classification processing unit 68 classifies feature information extracted by the extraction processing unit 64 by the classification item set by the classification item setting unit 66. Classification is enabled by, for example, assigning a tag associated with each classification item to feature information. It is also possible to execute a process of obtaining a number resulting from, for example, counting the number of pieces of feature information applicable to each classification item.

The classification processing unit 68 includes an estimation processing unit 69. The estimation processing unit 69 is an example of the estimation unit. The estimation processing unit 69 makes an estimation on the number of pieces of feature information in a non-captured period. The estimation processing unit 69 will be described later.

The providing server 70 includes the information provision accepting unit 72, an editing unit 74, a bill processing unit 76, and a sending unit 78.

The information provision accepting unit 72 accepts a request from a user through the PC 80 or the like to provide information. In issuing a request to provide information, a user is able to designate a location on which the user wants to get information, an extraction item to extract feature information, and a classification item to classify feature information. In issuing a request to provide information, a user is also able to designate a collection period of image data to extract information.

When the information provision accepting unit 72 accepts a request to provide information, the information provision accepting unit 72 immediately sends classified feature information 54 when there is already the classified feature information 54. However, when there is no classified feature information 54 that satisfies the accepted condition, the information provision accepting unit 72 sets an extraction item to the extraction item setting unit 62 of the analysis server 60 and further sets a classification item to the classification item setting unit 66. Thus, in the analysis server 60, the classified feature information 54 that satisfies the condition is generated and saved in the storage server 50. When no image data 52 that satisfies the condition is saved in the storage server 50, the information provision accepting unit 72 rejects the request from the user or sets a collection condition in the collection condition setting unit 42 of the collection server 40 and provides an instruction to start collecting new image data.

The editing unit 74 acquires the classified feature information 54 from the storage server 50 in accordance with a request accepted by the information provision accepting unit 72. Then, the editing unit 74 executes an editing process, such as graphing.

The bill processing unit 76 is an example of the billing unit. The bill processing unit 76 executes a billing process on a user in response to a request received by the information provision accepting unit 72. A bill is generally set so as to increase as the amount of information provided increases. A fee is set according to, for example, the number of locations on which information is to be provided, the number of pieces of feature information to be extracted, or the number of classification items.

The sending unit 78 is an example of the providing unit. The sending unit 78 sends information edited by the editing unit 74 to the PC 80.

The above-described configuration of the information providing system 30 is one example and may be modified into various modes. As an example, the classification processing unit 68 and the editing unit 74 are integrated as one and configured to immediately process classified results to data available for sending.

Next, a specific example of a process that is executed by the information providing system 30 will be described with reference to FIG. 4 to FIG. 8.

Figure 4:
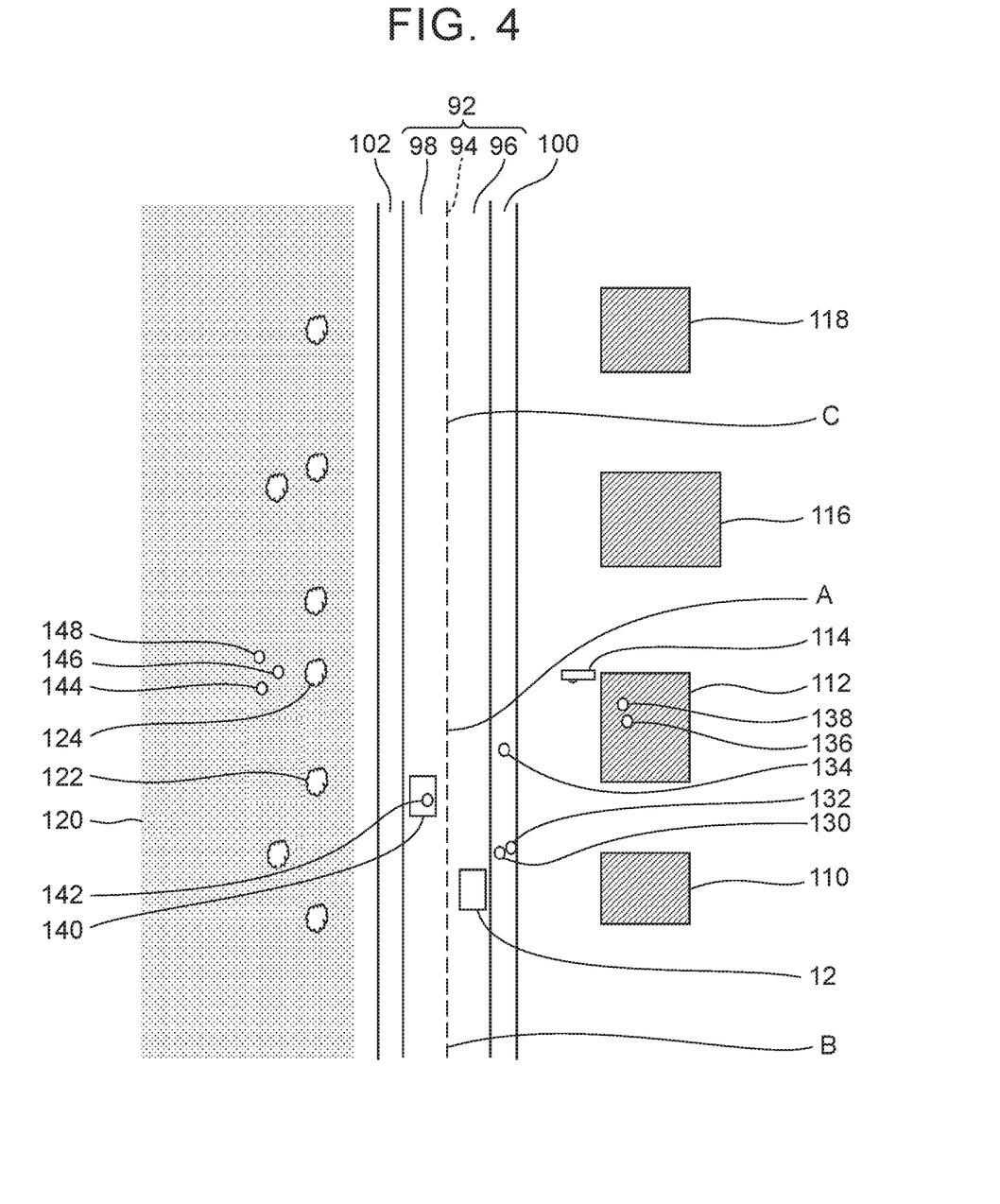
FIG. 4 is a map of an area where image data is captured by onboard cameras.
Figure 5:
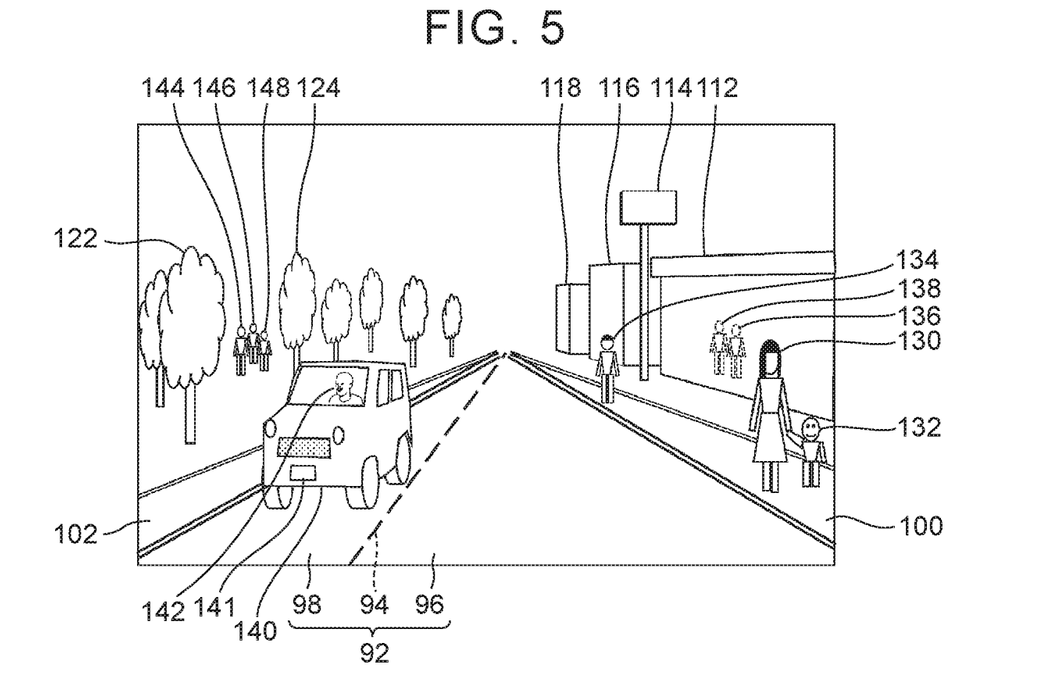
FIG. 5 is a snapshot of image data captured by an onboard camera.

FIG. 4 is a virtual map that shows an area in which information is intended to be collected by the information providing system 30. FIG. 5 is a view corresponding to FIG. 4 and shows an image at a point in time of image data captured by the vehicle 12 shown in FIG. 4.

As shown in FIG. 4, a roadway 92 extends in the middle of the map. Description will be made on the assumption that vehicles drive on the right side of the roadway 92. The roadway 92 is separated by a center line 94 into a right lane 96 and a left lane 98. A right sidewalk 100 is provided on the right of the roadway 92, and a left sidewalk 102 is provided on the left of the roadway 92. Locations A, B, and C are set in the roadway 92. The location A is set based on a request from a user. In the information providing system 30, the location B and the location C are set on both sides of the location A along the roadway 92, and a range from the location B to the location C (that is, a range around the location A) is set as a target to extract feature information of people and vehicles. The location B and the location C are selected from a range in which the flow of people and vehicles that pass through the roadway 92, the right sidewalk 100, and the left sidewalk 102 at the location A does not significantly change. In other words, the location B and the location C are set such that no intersection, no large-scale parking place, no large-scale public facility, or the like is included in the range from the location B to the location C.

As shown in FIG. 4, there are a building 110, a shop 112, an advertising sign 114, and buildings 116, 118 on the right to the right sidewalk 100 from the front toward the back. There is a park 120 that is an outdoor facility on the left to the left sidewalk 102. There are multiple trees 122, 124 and the like in the park 120.

On the right sidewalk 100, two pedestrians 130, 132 are walking from the location C side toward the location B side around in front of the building 110. The pedestrian 130 is a mother in her 20s and wears a sweater and a skirt. The pedestrian 132 is a girl child and wears a sweater and pants. In front of the shop 112 on the right sidewalk 100, a high school boy 134 wearing a uniform is walking from the location C side toward the location B side. In the shop 112, a clerk 136 and a customer 138 are talking to each other.

On the left lane 98, a vehicle 140 is running from the location C side toward the location B side. The vehicle 140 is a four-wheeled public vehicle named Y produced by X company (purchased by an ordinary household and often used privately). The vehicle 140 has a license plate 141. A male driver 142 in his 40s wearing a T-shirt is driving in the cabin of the vehicle 140. In the park 120, three walkers 144, 146, 148 are walking.

The information providing system 30 collects information around the location A of FIG. 4 based on a request from a user. The information providing system 30 sets the location B and the location C on both sides of the location A along the roadway 92 and makes a survey on people and vehicles that pass through an area from the location B to the location C.

The onboard camera 20 of the vehicle 12 captures an image ahead of the vehicle 12. Image data captured while the vehicle 12 runs from slightly before the location B to slightly before the location C is used for analysis. Image data to be captured is in a temporally continuous motion picture format and is obtained by continuously capturing the same object (for example, the pedestrian 130) while changing the angle. Therefore, it is possible to not only accurately grasp the location of the object but also grasp the motion and the like of the object.

Figure 6:
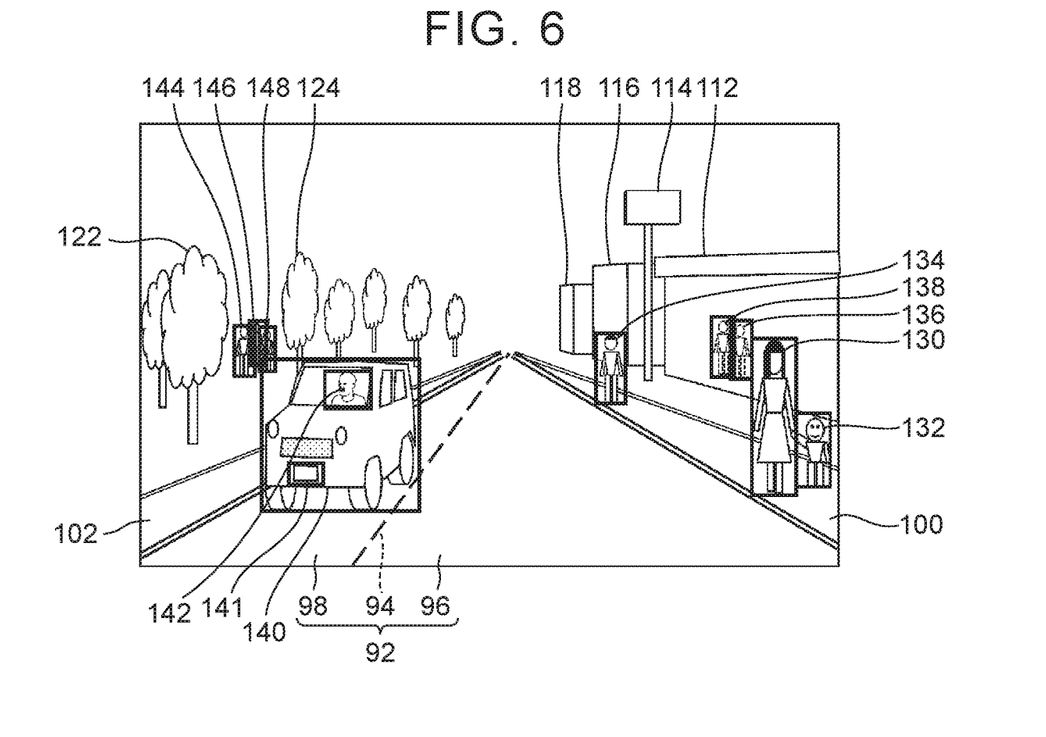
FIG. 6 is a view that shows an example of a process of extracting feature information from image data.

FIG. 6 is a view corresponding to FIG. 5 and shows an example of the extraction process that is executed by the extraction processing unit 64 of the analysis server 60. By using AI processing, the pedestrians 130, 132, 134, the clerk 136, the customer 138, the vehicle 140, the license plate 141, the driver 142, and the walkers 144, 146, 148 are recognized.

Figure 7:
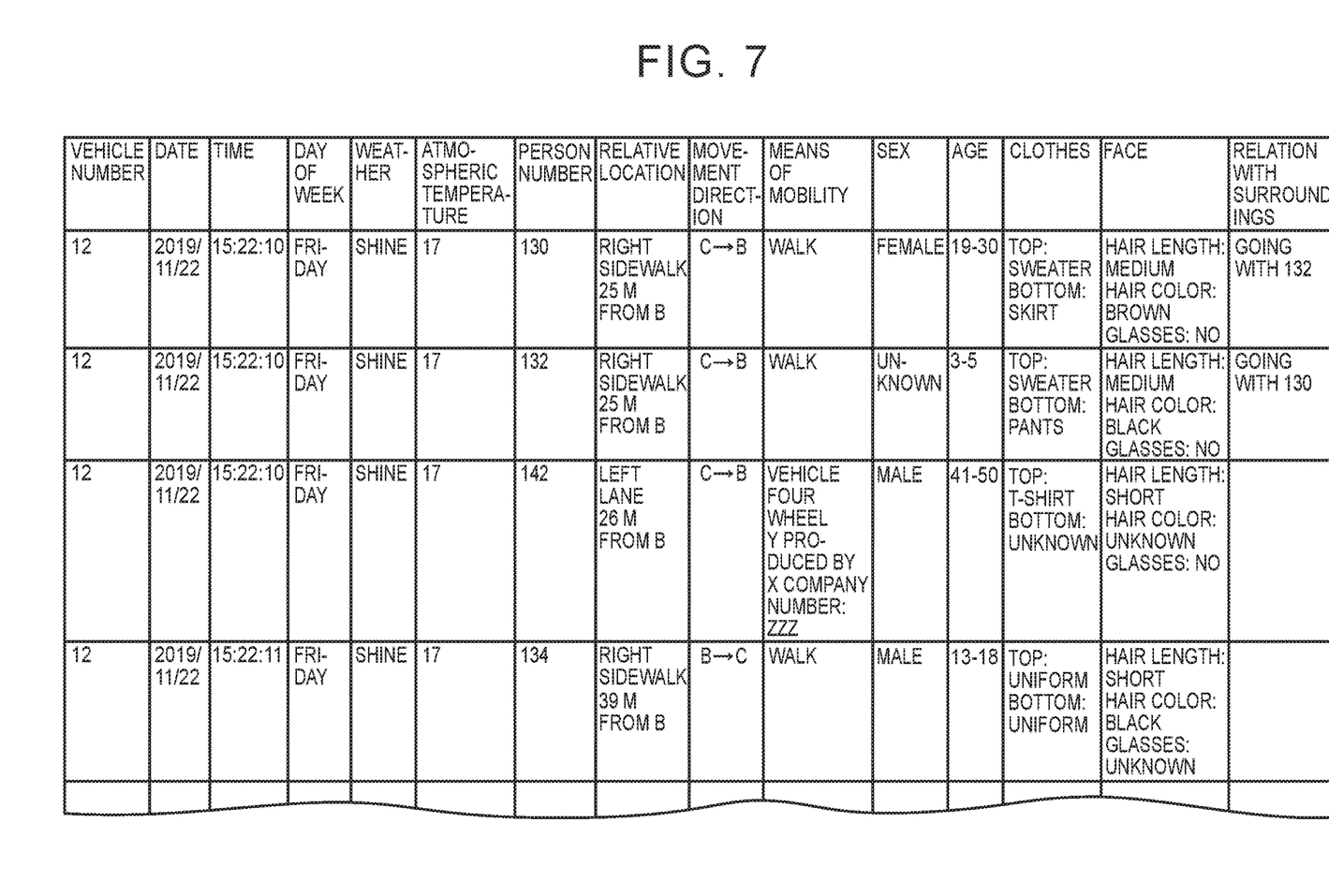
FIG. 7 is an example of extracted feature information.

FIG. 7 is a view that shows feature information extracted by the extraction processing unit 64 in tabular format. FIG. 7 provides items, that is, vehicle number, date, time, day of week, weather, atmospheric temperature, person number, relative location, movement direction, means of mobility, sex, age, clothes, face, and relation with surroundings.

A vehicle number is a number assigned to a vehicle captured. A date, time, and day of week are obtained from capture time data or calendar information. A value obtained from an outside air temperature sensor of the vehicle 12 or a meteorological observation system is input as an atmospheric temperature. A person number is a number assigned to each person recognized.

The items from movement direction to relation with surroundings are examples of the extraction item. A movement direction is extracted by AI processing on a motion picture image. A means of mobility, sex, age, clothes, and face are extracted by AI processing on image recognition. A relation with surroundings is extracted by identifying the activity, line of sight, facial expression, and the like of each person in a motion picture image.

The example shown in FIG. 7 all shows the processed results of image data captured by the vehicle 12. By setting 15:22:10 on 2019/11/22 (Friday, shine, atmospheric temperature of 17 degrees Celsius) as representative time, the pedestrian 130 is recognized, and a person number of 130 is assigned. At this time, it is extracted that the pedestrian 130 is moving on foot from the location C toward the location B at a location 25 m from the location B on the right sidewalk 100. In addition, it is also extracted that the pedestrian 130 is a woman in the age of 19 to 30, wearing a sweater as a top and a skirt as a bottom. Furthermore, it is also extracted that her hair is medium long and brown, not wearing glasses, and going with the pedestrian 132 to whom a person number of 132 is assigned.

It is also extracted that the pedestrian 132 is moving on foot from the location C toward the location B at a location 25 m from the location B on the right sidewalk 100. However, sex is not identified by AI processing. It is extracted that the pedestrian 132 is in the age of three to five, wearing a sweater as a top and wearing pants as a bottom, with black medium long hair, wearing no glasses.

In the example of FIG. 7, features extracted similarly are also collected for the driver 142 of the vehicle 140. In other words, FIG. 7 shows that the driver 142 to whom a person number 142 is assigned is driving a vehicle to move from the location C toward the location B at a location 26 m from the location B on the left lane 98. It is extracted that a means of mobility is a four-wheeled vehicle named Y produced by X company with a license plate of ZZZ. It is also extracted that the driver 142 is a male in the age of 41 to 50, wearing a T-shirt as a top with unknown-colored short hair with no glasses. There is no writing in the field of relation with surroundings, and it is extracted that the driver 142 is driving in the vehicle 140 alone.

In the example of FIG. 7, feature information on the pedestrian 134 is also extracted. On the other hand, in the example of FIG. 7, no feature information is extracted for the clerk 136 or the customer 138 in the shop 112. This is because the clerk 136 and the customer 138 are not passersby and extracting feature information of the clerk 136 and the customer 138 does not agree to the purpose of making a survey on passersby. However, feature information may be collected from the inside of the shop 112 by, for example, getting permission from the shop 112.

In the example of FIG. 7, no feature information is extracted for the walkers 144, 146, 148 in the park 120. This is because the walkers 144, 146, 148 are walking at a location away from the left sidewalk 102 and are not regarded as passersby. When the walkers 144, 146, 148 walk in the park 120 reciprocally many times, there are concerns that the number of people may be counted repeatedly. However, when the walkers 144, 146, 148 walk along the left sidewalk 102 at a location near the left sidewalk 102, the walkers 144, 146, 148 may be regarded as passersby, and feature information may be extracted.

In the analysis server 60, the classification processing unit 68 classifies the thus obtained feature information by classification items. Then, the editing unit 74 makes a graph or the like.

Figure 8:
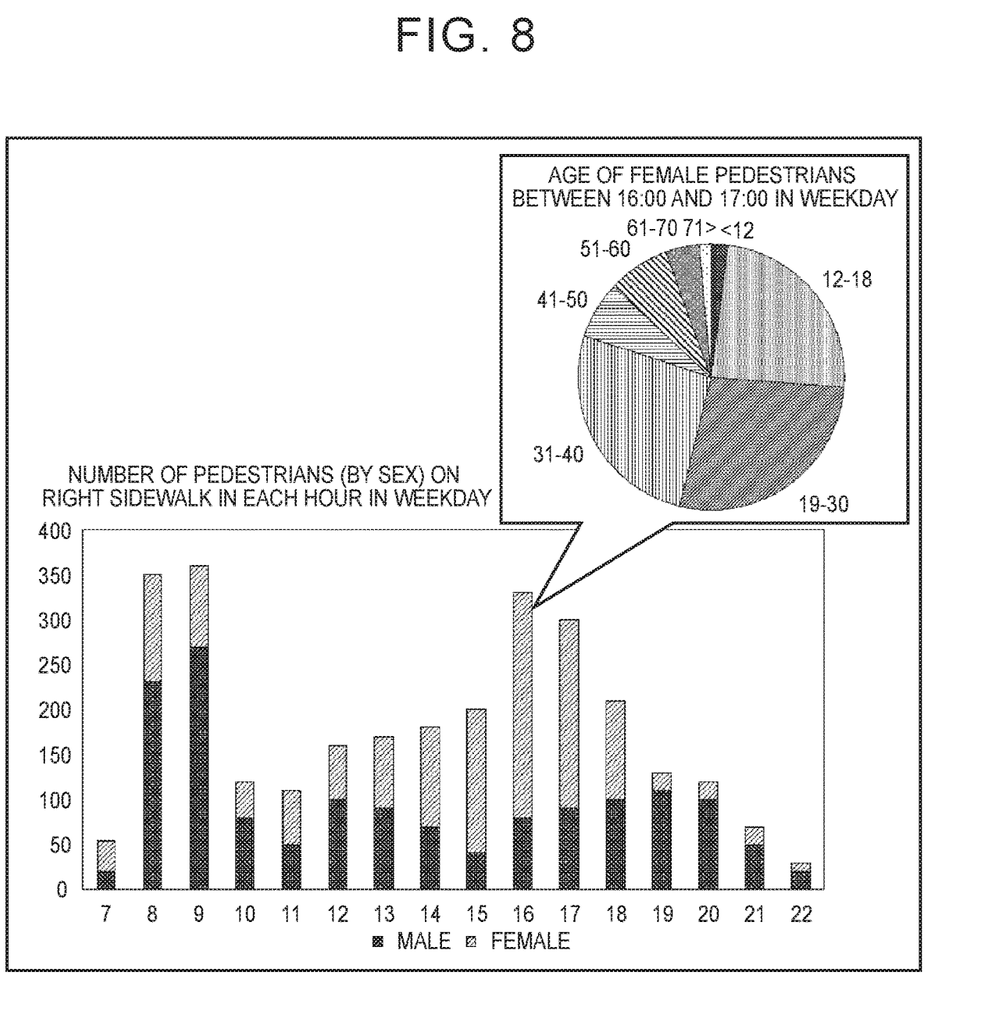
FIG. 8 is an example of graphs obtained by classifying feature information by classification item.

FIG. 8 is a view that shows an example of information to be provided, prepared by the editing unit 74. FIG. 8 illustrates a graph showing information on pedestrians that walk on the right sidewalk 100 around the location A (area from the location B to the location C).

The bottom-left bar graph in FIG. 8 shows the number of pedestrians in each one hour from seven o'clock to 23 o'clock by sex. In other words, FIG. 8 is an example obtained by classifying the number of pedestrians, which is feature information, by time and sex as classification items. According to this bar graph, it is found that the number of pedestrians, mainly men, is very large between eight o'clock and nine o'clock and between nine o'clock and 10 o'clock. It is also found that the number of pedestrians, mainly women, is very large between 16 o'clock and 17 o'clock and between 17 o'clock and 18 o'clock.

The circle graph in the top right of FIG. 8 represents the age ratio of female pedestrians between 16 o'clock and 17 o'clock. In other words, the circle graph is an example obtained by classifying the number of pedestrians, which is feature information, by using age as a classification item. According to the circle graph, it is found that women in the age of 12 to 18, women in the age of 19 to 30, and women in the age of 31 to 40 each occupy about 25% and a majority.

When a user is a person concerned with the shop 112, the user is able to browse information as shown in FIG. 8 on the PC 80 and use the information in marketing activity for the shop 112. Then, it is conceivable to, for example, change the details of an electronic advertising sign or change the display of goods according to the age of passersby. It is also conceivable to open a mobile shop using a vehicle in front of the shop 112 in hours when there are many pedestrians. When a user is a person who is considering whether to move into the shop 112 as a tenant, it is possible to grasp whether targets of business under study are walking.

Although not shown in FIG. 8, it is also important in marketing research to grasp pedestrians on the left sidewalk 102 and further grasp people that pass by vehicles on the roadway 92. With the information providing system 30, it is possible to present various pieces of extracted information classified by classification items required by a user in response to a request from the user.

When quantitative research, such as counting the number of pedestrians as in the case of the example of FIG. 8, is performed, it is conceivable that the number may be counted repeatedly by the onboard cameras 20 of the multiple vehicles 12, 14 or the number is not grasped because image data is not captured. To deal with this case, description will be made with reference to FIG. 9 and FIG. 10.

Figure 9:
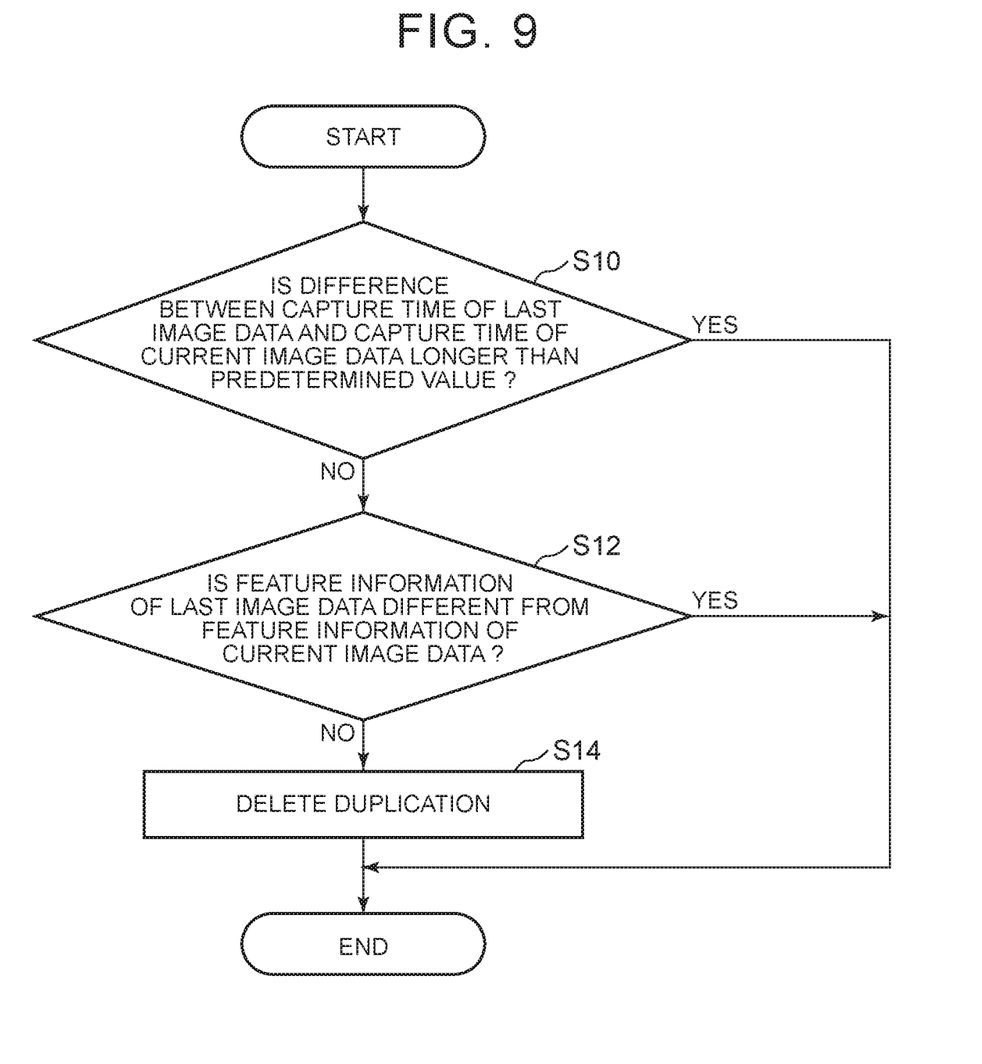
FIG. 9 is a flowchart that shows a duplication prevention process.

FIG. 9 is a flowchart that illustrates a duplication prevention process that is executed by the duplication prevention processing unit 65 of the extraction processing unit 64. The duplication prevention processing unit 65 determines whether a difference between capture time of last image data and capture time of current image data is longer than a predetermined value based on capture time data of the different onboard cameras 20 (S10). When the difference is longer than the predetermined value (Yes), the duplication prevention processing unit 65 determines that there is no duplication and ends the process. On the other hand, when the difference is shorter than the predetermined value (No), there is a possibility of extracting the same person or the same vehicle from the respective pieces of image data. Then, the duplication prevention processing unit 65 determines whether a feature value extracted from the last image data is different from a feature value extracted from the current image data (S12). When the feature values are different (Yes), the duplication prevention processing unit 65 determines that there is no duplicate feature information and ends the process. On the other hand, when the feature values match (No), the duplication prevention processing unit 65 determines that there is duplication and deletes the duplicate part (S14). By executing this process on all the pieces of image data, duplication is prevented.

Figure 10:
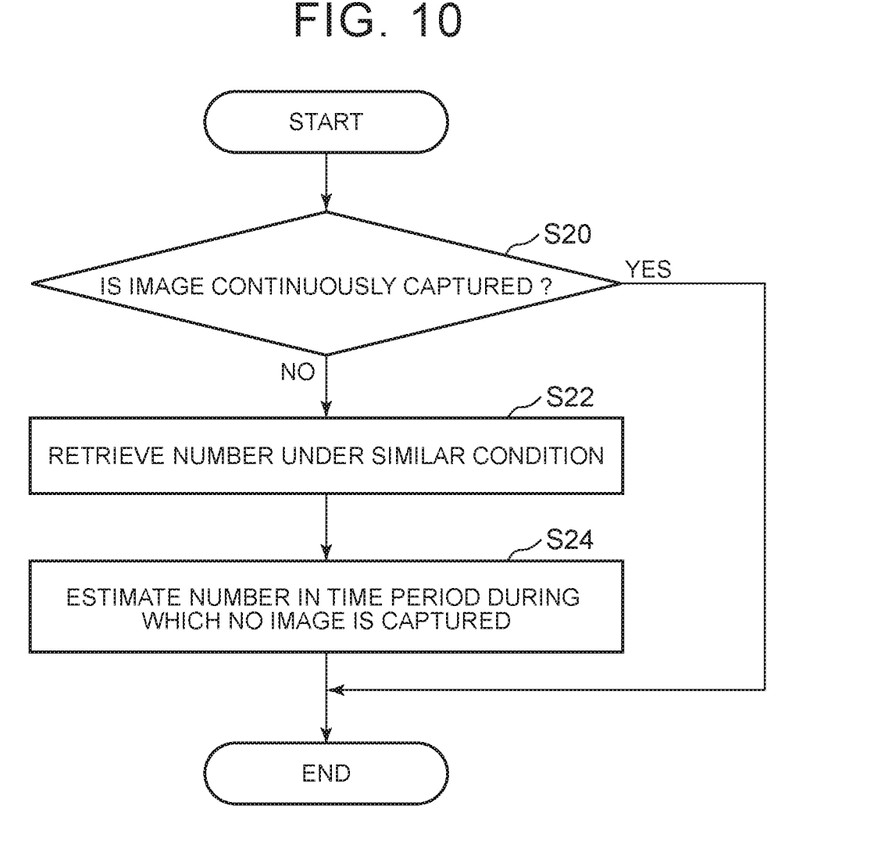
FIG. 10 is a flowchart that shows a number estimation process in a non-captured period.

FIG. 10 is a flowchart that illustrates an estimation process that is executed by the estimation processing unit 69 of the classification processing unit 68. The classification processing unit 68 initially determines whether an image around an intended location is continuously captured (S20). When an image around the intended location is continuously captured (Yes), all the people or vehicles present around the location can be extracted, so the classification processing unit 68 ends the process. On the other hand, when there is a time during which no image is captured (No), people or vehicles that actually pass by may not be extracted. Then, the classification processing unit 68 retrieves the number of people, vehicles, or the like extracted under a similar condition (S22). Examples of the similar condition include time near a time period during which no image is captured and the same time period in another day (which may be the same day of week) as a time period during which no image is captured. The classification processing unit 68 estimates the number in a time period during which no image is captured, by using a number under a condition that satisfies the similar condition (S24). Thus, the classification processing unit 68 is able to calculate a number for all the time periods.

In the above-description, an example in which feature information of a person is extracted and then classified is described. Similarly, it is also possible to extract and classify feature information of a vehicle. Thus, it is possible to grasp, for example, the number of vehicles that run on the roadway 92 according to time period, day of week, and type. Thus, municipalities or the like are able to simply grasp, for example, the traffic flow of vehicles around a specific location.

In the above description, an example of a mode of making a survey on people or vehicles that pass around a specific location is described. The information providing system 30 is also capable of grasping people or vehicles that pass through an area including one or multiple intersections. At intersections, the flow of people and vehicles diversifies or merges. By grasping movements of people and vehicles, it is possible to grasp feature information of people and vehicles even in an area including one or more intersections. When a further wide area is set as a target, it is also possible to grasp, for example, the flow of people and vehicles in a city. Such information is useful in making a city planning, such as making a plan for a new road or a new station. In addition, it is also useful to, for example, plan a travel route of an election campaign car that is used in election, an advertisement car that performs advertisement, or the like.

What is claimed is:

1. An information providing system comprising one or more processors configured to:

collect image data, captured by multiple onboard cameras, in association with information of locations of the captured image data;

extract, from the image data captured around one location, feature information associated with an extraction item for a person or a vehicle around the location;

classify the extracted feature information by classification item;

provide the classified feature information to a user;

make an estimation based on the feature information extracted under a similar condition for a time period during which no image data is captured by the multiple onboard cameras; and when the image data captured by the multiple onboard cameras contains the person or the vehicle twice or more, prevent duplicate extraction of the feature information, wherein the extraction item and the classification item are set based on a request from the user.

2. The information providing system according to claim 1, wherein the extraction item includes at least one of movement information, age, and sex of the person.

3. The information providing system according to claim 1, wherein the extraction item includes at least one of movement information, type, and occupant information of the vehicle.

4. The information providing system according to claim 1, wherein:

the one or more processors are configured to acquire the image data further in association with timing information of the captured image data;

the classification item includes an item to be classified by time; and the one or more processors are configured to classify the extracted feature information by time based on the timing information.

5. The information providing system according to claim 1, wherein the one or more processors are further configured to accept a request from the user to provide information with the designated extraction item, wherein:

when there is no feature information associated with the designated extraction item, the one or more processors are configured to newly extract the feature information associated with the extraction item;

the one or more processors are configured to classify the newly extracted feature information; and the one or more processors are configured to provide the newly classified feature information to the user.

6. The information providing system according to claim 1, wherein the one or more processors are further configured to accept a request from the user to provide information with the designated classification item, wherein:

when there is no feature information classified by the designated classification item, the one or more processors are configured to newly classify the feature information by the classification item; and the one or more processors are configured to provide the newly classified feature information to the user.

7. The information providing system according to claim 1, wherein the one or more processors are further configured to accept a request from the user to provide information, wherein, when there is no image data that meets the accepted request, the one or more processors are configured to newly collect the image data that meets the request.

8. An information providing method comprising:

collecting image data, captured by multiple onboard cameras, in association with information of locations of the captured image data;

extracting, from the image data captured around one location, feature information associated with an extraction item for a person or a vehicle around the location;

classifying the extracted feature information by classification item;

providing the classified feature information to a user, wherein the extraction item and the classification item are set based on a request from the user;

making an estimation based on the feature information extracted under a similar condition for a time period during which no image data is captured by the multiple onboard cameras; and when the image data captured by the multiple onboard cameras contains the person or the vehicle twice or more, preventing duplicate extraction of the feature information.

9. An information terminal comprising one or more processors configured to:

set an extraction item and a classification item;

for a person or a vehicle that passes around the location, receive data containing feature information extracted for the extraction item from image data captured by multiple onboard cameras and classified by the classification item;

display the received data;

make an estimation based on the feature information extracted under a similar condition for a time period during which no image data is captured by the multiple onboard cameras; and when the image data captured by the multiple onboard cameras contains the person or the vehicle twice or more, prevent duplicate extraction of the feature information.

10. An information display method comprising:

setting an extraction item and a classification item;

for a person or a vehicle that passes around the location, receiving data containing feature information extracted for the extraction item from image data captured by multiple onboard cameras and classified by the classification item;

displaying the received data;

making an estimation based on the feature information extracted under a similar condition for a time period during which no image data is captured by the multiple onboard cameras; and when the image data captured by the multiple onboard cameras contains the person or the vehicle twice or more, preventing duplicate extraction of the feature information.

11. The information providing system according to claim 1, wherein the one or more processors are further configured to bill the user according to the set extraction item or the set classification item.

* * * * *